US006206750B1

(12) United States Patent
Barad et al.

(10) Patent No.: US 6,206,750 B1
(45) Date of Patent: Mar. 27, 2001

(54) PERSONALIZED TOYS AND METHODS FOR MANUFACTURING AND DELIVERING THE SAME

(75) Inventors: Jill E. Barad, Los Angeles, CA (US); Jeanette Corcuera, Boston, MA (US); Greg Vineyard, Los Angeles, CA (US); Darian Pasterski, Palos Verdes Estates, CA (US); Joe Scully, Manhattan Beach, CA (US); John Watson, Placentia, CA (US); Roy Kaneshiro, San Pedro, CA (US); Brian Channell, Redondo Beach, CA (US); Jean Chu, San Gabriel, CA (US); Nancie Martin, Culver City, CA (US); Simon Cheung Shu Keun; Li Tak Chee, both of Hong Kong (CN)

(73) Assignee: Mattel, Inc., El Segundo, CA (US)

( * ) Notice: Subject to any disclaimer, the term of this patent is extended or adjusted under 35 U.S.C. 154(b) by 0 days.

(21) Appl. No.: 09/183,323

(22) Filed: Oct. 30, 1998

(51) Int. Cl.[7] ........................................................ A63H 3/00
(52) U.S. Cl. .................................. 446/268; 705/28
(58) Field of Search ............................... 40/1; 705/16, 22, 705/29, 26, 27, 28, 500; 446/268, 337; 382/100; 428/40.1

(56) References Cited

U.S. PATENT DOCUMENTS

| | | |
|---|---|---|
| 2,518,711 | 8/1950 | Mulford . |
| 3,534,396 | 10/1970 | Hart et al. . |
| 4,029,341 | * 6/1977 | Neill et al. ............................ 229/303 |
| 4,149,246 | 4/1979 | Goldman . |
| 4,297,724 | 10/1981 | Masuda et al. . |
| 4,539,585 | 9/1985 | Spackova et al. . |
| 4,546,434 | 10/1985 | Gioello . |
| 4,795,397 | 1/1989 | Stevens . |
| 4,823,285 | 4/1989 | Blancato . |
| 5,141,466 | 8/1992 | Catizone . |
| 5,279,514 | 1/1994 | Lacombe et al. . |
| 5,379,886 | 1/1995 | Brauner et al. . |
| 5,387,107 | 2/1995 | Gunter et al. . |
| 5,468,172 | 11/1995 | Basile . |
| 5,515,592 | 5/1996 | Mills . |
| 5,555,496 | 9/1996 | Tackbary et al. . |
| 5,563,992 | 10/1996 | Murata et al. . |
| 5,582,293 | 12/1996 | Kay . |
| 5,755,327 | 5/1998 | Saltsman et al. . |
| 5,776,571 | * 7/1998 | Michlin et al. ...................... 428/40.1 |
| 5,826,787 | * 10/1998 | Turner ................................... 229/303 |
| 5,930,769 | * 7/1999 | Rose ....................................... 705/27 |
| 5,960,412 | 9/1999 | Tackbary et al. . |
| 5,983,200 | * 11/1999 | Slotznick ............................... 705/26 |
| 5,983,201 | * 11/1999 | Fay ......................................... 705/27 |

OTHER PUBLICATIONS

T. L. Kunii et al., "An interactive fashion design system 'INFADS'," *Computers & Graphics, An International Journal*, vol. 1, No. 4, pp. 297–302 (Dec. 1975).
Barbie Fashion Designer CD–ROM User Guide, Mattel, Inc., 1996.
Barbie Cool Looks Fashion Designer CD–ROM User Guide, Mattel, Inc., 1997.

* cited by examiner

*Primary Examiner*—Sam Rimell
(74) *Attorney, Agent, or Firm*—Kolisch Hartwell Dickinson McCormack & Heuser

(57) ABSTRACT

A personalized toy and a method for marketing a toy through the use of computer screen images, and of manufacturing a personalized toy. The personalized toy is manufactured as ordered by a customer. Several different configurations of components that may be assembled as part of a finished toy are provided. Computer screen images of the different configurations of at least one of the components are displayed on a computer, and a customer viewing the displayed images is allowed to record a selected configuration of component, to be assembled as part of the personalized toy. A representational image of the toy incorporating the selected configuration may be displayed.

20 Claims, 16 Drawing Sheets

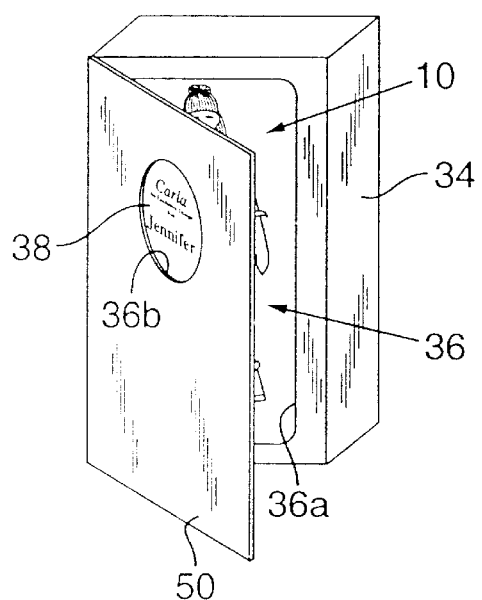
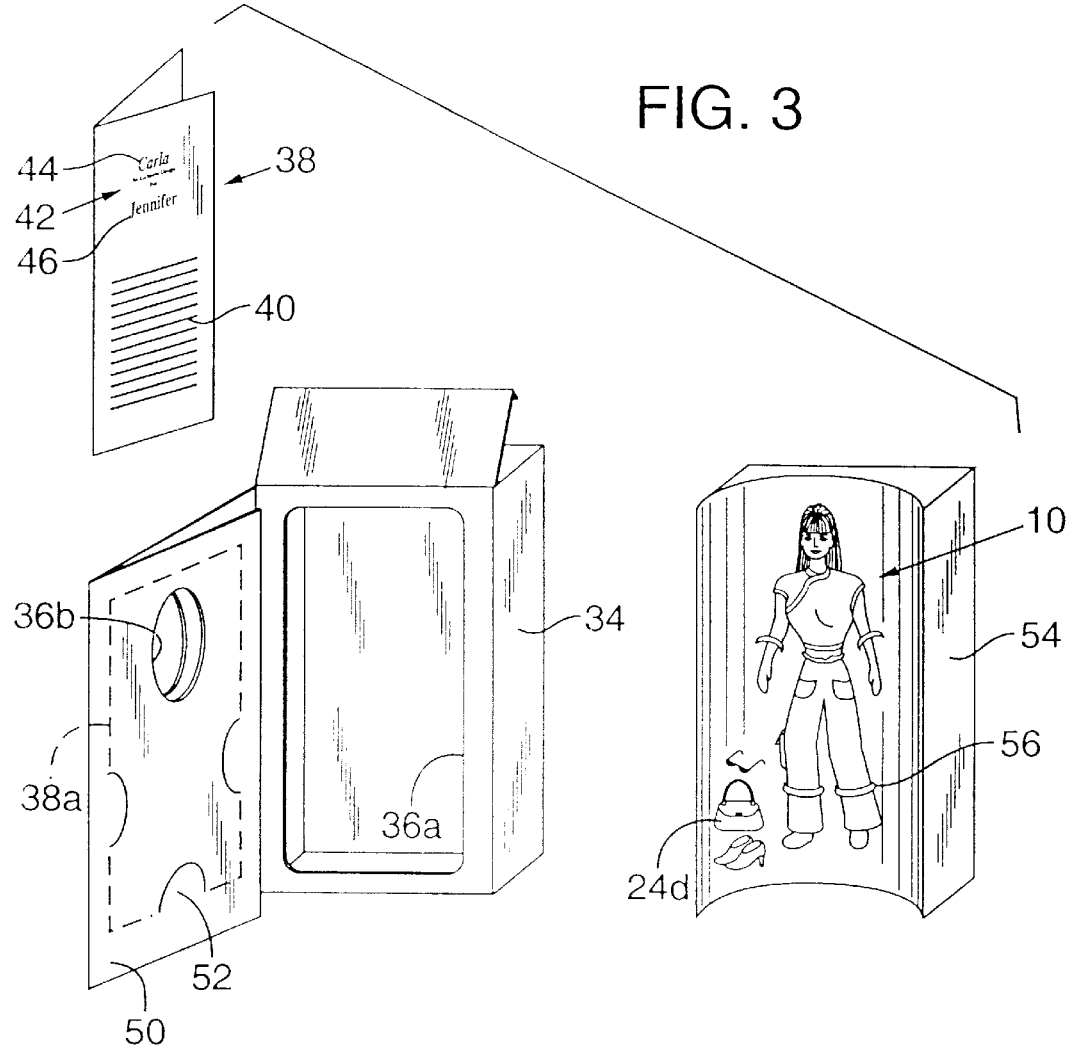

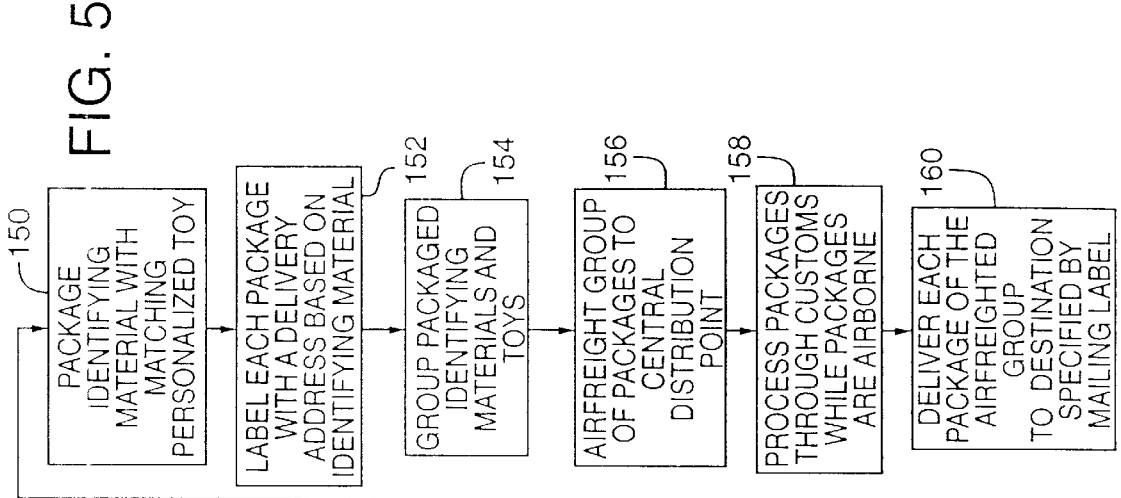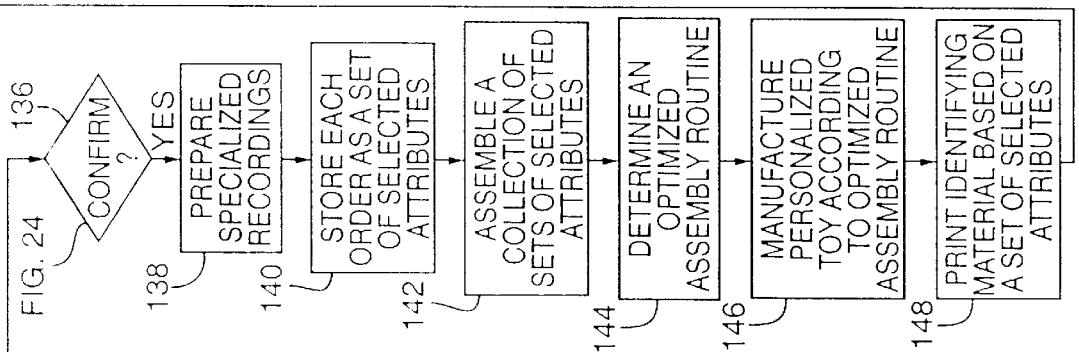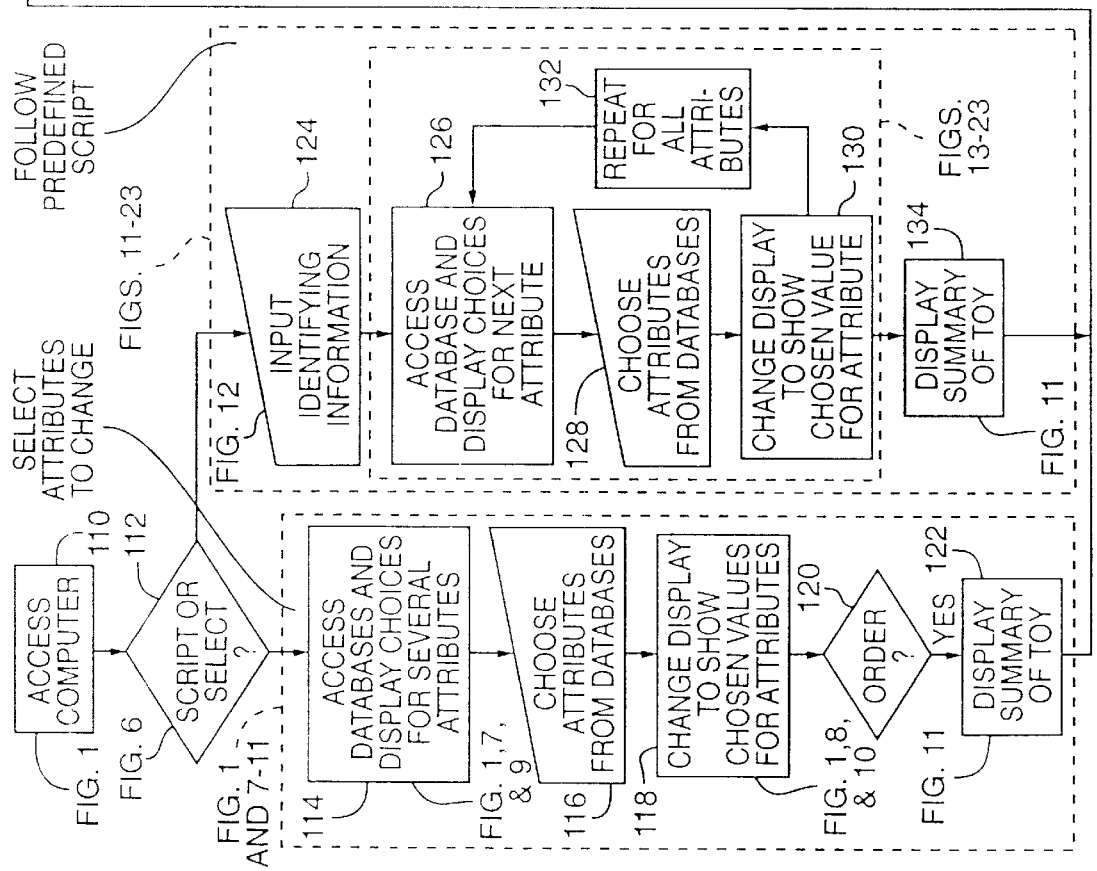

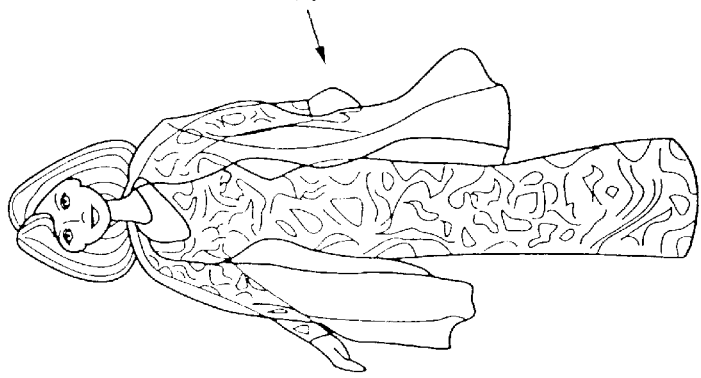
*Personalize your own friend of Barbie doll!*
Make your selections and we will custom-make a beautiful doll especially for you!
Ready, Set, Be Creative
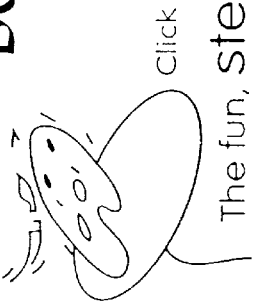
Click
The fun, step-by-step way.
30d
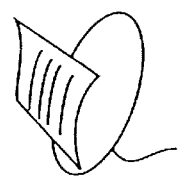
Click
The fun but quick way.
30c
You can choose her:
- Look
  - Eye color
  - Hairstyle
  - Hair color
  - Fashions
  - Accessories
  - Personality
Thousands of combinations!
Made for Jennifer
help
26
28
FIG. 6

FIG. 9

To help us create your doll's personality profile, please tell us:

Maximum 22 letters and spaces in blanks below
please do not use all capital letters Your Name: [          ]

Doll's Name: [          ]

Is this a gift for someone else? Yes○ No◉

___ has sparkling blue eyes and pulled back & pretty brown hair. She is wearing her new Cool Jeans Outfit with City Shopper accessories. Her birthday is in [-----▼]. She lives in [--------▼], and spends a lot of time [--------▼]. She's interested in [-----▼], loves to [-----▼] and enjoys being with [--------▼]. ___ is a special friend of Barbie, and is personalized by you,!

26
28
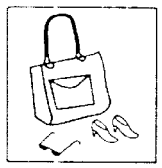

Back
30 to change selections

30
Forward
Well Done!

FIG. 10

To help us create your doll's personality profile, please tell us:

Maximum 22 letters and spaces in blanks below
please do not use all capital letters Your Name: [Chuck]

Doll's Name: [Carla]

Is this a gift for someone else? Yes◉ No○
If yes, for whom? [Jennifer]

Carla has sparkling blue eyes and pulled back & pretty brown hair. She is wearing her new Cool Jeans Outfit with City Shopper accessories. Her birthday is in [January ▼]. She lives in [another country ▼], and spends a lot of time [practicing sports ▼]. She's interested in [community work ▼], loves to [surf the Web ▼] and enjoys being with [her teammates ▼]. Carla is a special friend of Barbie, and is personalized by you, Chuck!

26
28
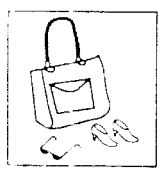

Back
30 to change selections

30
Forward
Well Done!

FIG. 11

Carla, a friend of Barbie
by Chuck

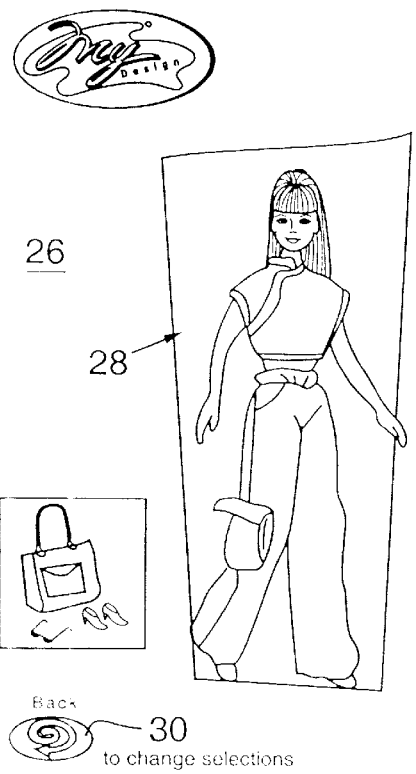

26
28

Back
 30
to change selections

Carla has sparkling blue eyes and pulled back & pretty brown hair. She is wearing her new Cool Jeans Outfit with City Shopper accessories. Her birthday is in January. She lives in another country, and spends a lot of time practicing sports. She's interested in community work, loves to surf the Web and enjoys being with her teammates. Carla is a special friend of Barbie, and is personalized for you, Jennifer, from Chuck!

Print
Click here to print this screen
to keep and show your friends
and family
30

Order
Click here to
purchase the doll you've
just personalized!
•Must be 18 or over. Currently available
only in the contiguous 48 U.S. states
30

Start Over
Click here to play
again and personalize
another doll!
30

FIG. 12

To Personalize your doll:
1. Give her a name
2. Select her look
3. Select her eye color
4. Select her hairstyle
5. Select her hair color
6. Select her fashion
7. Select her accessory set
8. Select her personality Then see your
finished doll
on the screen!

Change your mind as often
as you like until you have the
perfect doll for you!

Back
 30

To help us create your doll's personality profile, please tell us:

Maximum 22 letters and spaces in blanks below
please do not use all capital letters Your Name: | Claire |

Doll's Name: | Clara |

Is this a gift for someone else? Yes ○ No ⦿

26

30 Forward
to select doll's look

 STEP 5 Select Clara's hair color. FIG. 17
 blond  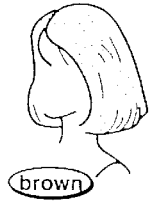 brown
 red   black — 30
 ← 28
Back
🌀 — 30
to change doll's eye color
26
Forward
30 — 🌀
to see doll's picture
FIG. 18
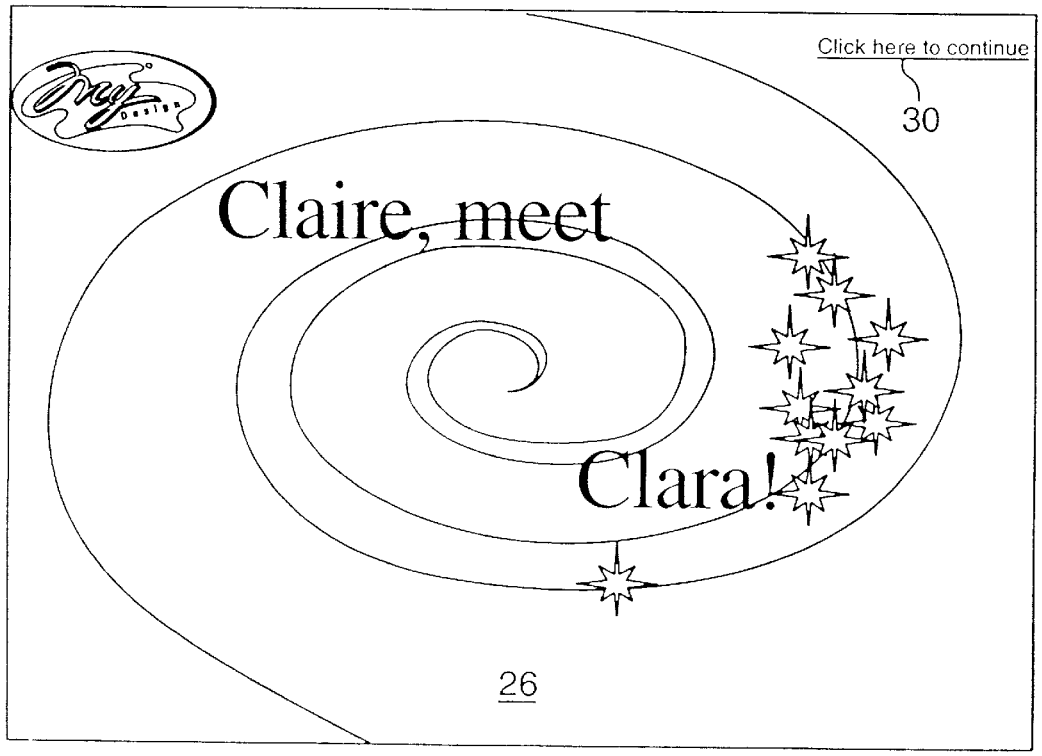

FIG. 19
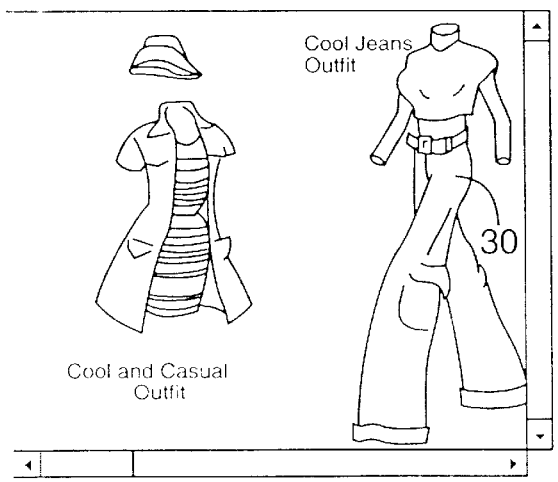
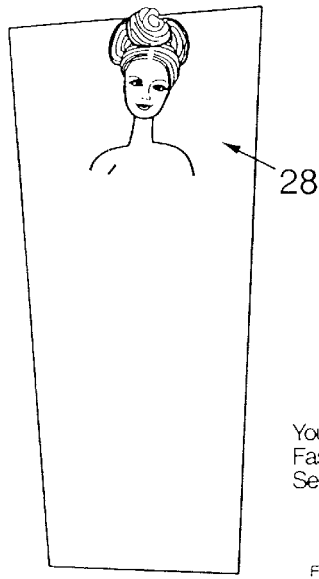
FIG. 20

FIG. 27

PERSONALIZED TOYS AND METHODS FOR MANUFACTURING AND DELIVERING THE SAME

BACKGROUND AND SUMMARY OF THE INVENTION

The present invention relates generally to personalized toys and methods for marketing, manufacturing and delivering personalized toys. The toys may include virtually any type of toy, such as a doll, as described herein.

Using the present invention as a guide, patents were discovered disclosing what could be described as personalized toys, typically dolls. For example, U.S. Pat. Nos. 4,795,397, 5,141,466, 5,279,514, 5,387,107, 5,468,172, and 5,515,592, the disclosures of which are incorporated herein by reference, disclose various embodiments of dolls. However, these disclosures are limited, disclosing only attaching a photograph or other image to the toy, or recording audio information for audible playback by the toy.

The above incorporated references also are limited in that they disclose only toys that are intended to mimic the appearance or voice of an existing individual. There is no opportunity for creativity in the selection or manufacturing of the disclosed toys. Furthermore, there is no method for visualizing any changes in appearance of the toy prior to manufacturing the toy. Nor is there any need for such a method, given the intended true-to-life design of all of the toys disclosed in these incorporated references.

The present invention allows a user to create a personalized toy through interactive computer programs, receiving immediate feedback on changes made to the toy. It also includes steps for limiting the extent to which particular configurations of components may be selected by consumers, personalizing packaging for a personalized toy, optimizing the manufacturing of large quantifies of personalized toys, and delivering each personalized toy and any accompanying material to the intended recipient of the toy, accurately, reliably, and quickly.

Also using the present invention as a guide, examples of video and computer systems to visualize changed appearances of items are found in U.S. Pat. Nos. 4,823,285, 4,297,724, 4,539,585, and 5,563,992, the disclosures of which are incorporated herein by reference. However, none of these disclosures teaches the present invention in which a personalized toy is assembled based on interactive selections made for configurations of at least some of the components of the toy.

Similarly, examples of product-containing boxes or packages in which the appearance of the package is modified by at least a portion of the content being visible through the package were found in U.S. Pat. Nos. 2,518,711, 5,379,886, 5,582,293, and 5,755,327, the disclosures of which are incorporated herein by reference. Yet no known package is combined with a personalized toy and identifying material for the toy, as described in more detail below.

The advantages of the present invention will be understood more readily after a consideration of the drawings and the following detailed description.

BRIEF DESCRIPTION OF THE DRAWINGS

FIG. 2 is an isometric view of a personalized toy and its packaging, manufactured utilizing the steps illustrated in FIG. 1.

FIG. 3 is an isometric view showing selected components of the personalized toy and packaging of FIG. 2.

FIG. 5 is a flowchart representing some of the steps in an embodiment of the invented method, including the steps illustrated in FIG. 1, to manufacture the personalized toy of FIG. 2.

FIG. 6 is a computer screen image illustrating a branching step within FIG. 5, in which a customer chooses whether to follow a scripted procedure or follow a more selective procedure for specifying the configuration of a personalized toy.

FIG. 9 is a computer screen image illustrating additional display and selection steps of FIG. 5, including direct data entry and selection from predefined attributes of a text message to accompany a personalized doll.

FIG. 10 is a computer screen image similar to FIG. 9, illustrating a changed display including chosen values for attributes of the printed message of FIG. 9.

FIG. 11 is a computer screen image illustrating the step of displaying a narrative summary of the personalized toy created using the steps of FIGS. 1 and 5–10, and illustrating the step of confirming the selection of attributes for components of a personalized toy, in the form of an "Order" icon and a "Print" icon.

FIG. 12 is a computer screen image illustrating the step of inputting identifying information, as part of a scripted procedure for ordering a personalized toy.

FIG. 17 is a computer screen image illustrating the step of selecting a hair color for a doll.

FIG. 18 is a computer screen image illustrating a graphical transition step, incorporating selected attributes associated with a personalized toy.

FIG. 19 is a computer screen image illustrating the display of a realistic image of a personalized doll, representing customer selection of skin color and facial characteristics, eye color, hairstyle, and hair color.

FIG. 20 is a computer screen image illustrating the step of selecting a fashion outfit for a doll.

FIG. 27 is a layout showing a production document specially designed for use as part of the invented method to manufacture a personalized toy.

DETAILED DESCRIPTION OF EMBODIMENTS OF THE INVENTION

Figure 1:
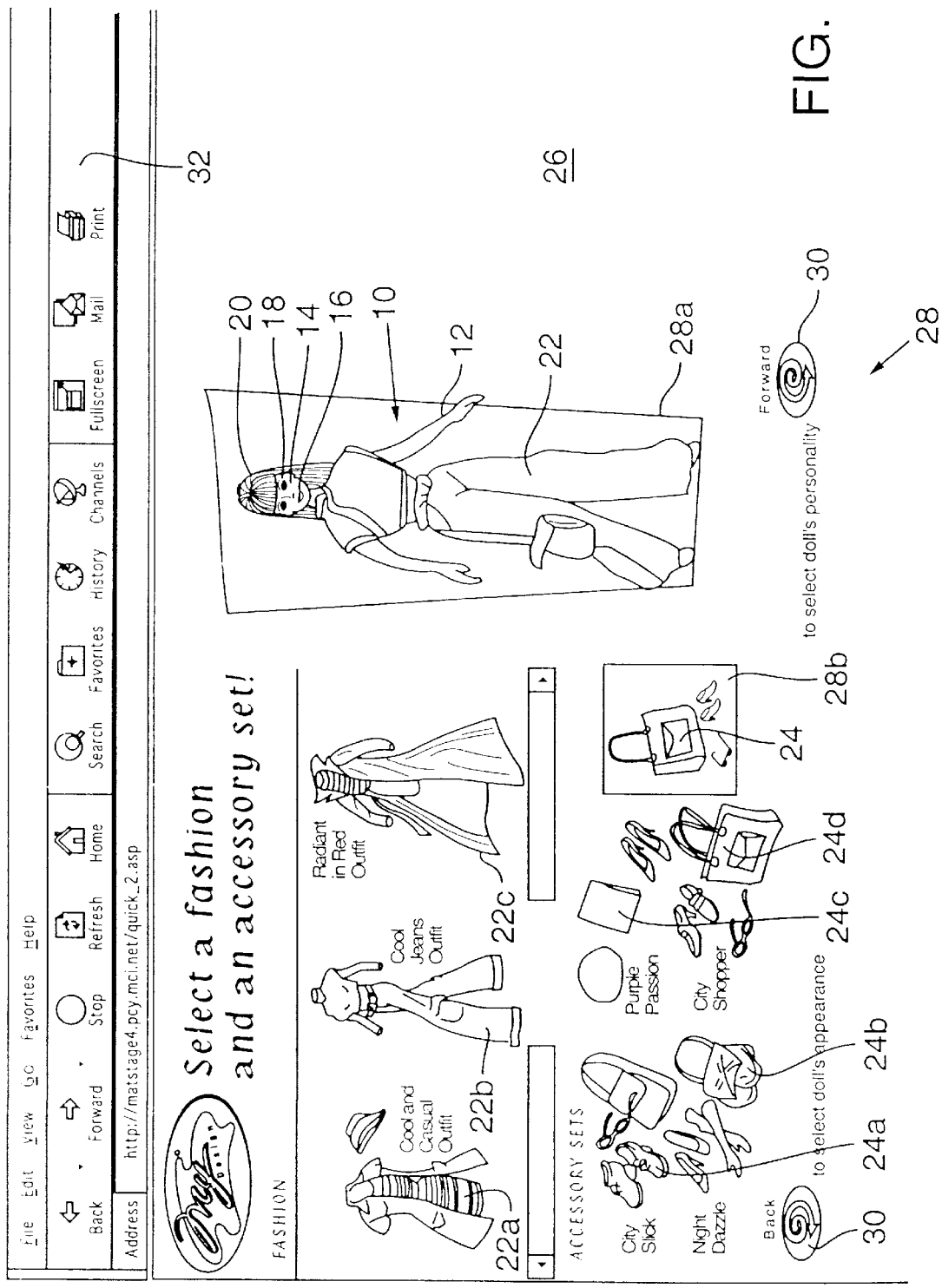
FIG. 1 is a computer screen image illustrating several steps in the invented method for manufacturing a personalized toy, specifically a personalized doll as represented in FIG. 1.

Referring to FIG. 1, a computer screen image is shown, including a representational image of a personalized doll and of several components and several different configurations of components that may be assembled as part of a doll. The personalized doll is indicated at 10, including a body 12, having a skin color, such as ivory, tan, or brown. Depending on the amount of personalization desired for the personalized toy, numerous configurations of body 12 and its skin color may be provided. Furthermore, it should be understood that, while the present invention is described with respect to a doll and its clothing, it is intended that the invention include a method to make many other types of personalized toys, such as toy vehicles, race sets, construction sets, and games.

Other components of toy 10 include a head 14 having a mouth 16, with a selectable shape. Eyes 18 may be specified to include a particular configuration of eye color, and hair style 20 may be selected from various configurations, and specified to be of a particular configuration of hair color. Similarly, a clothing fashion 22 may be selected from various configurations of clothing fashions, and an accessory set 24 may be selected. In FIG. 1, three different configurations of clothing fashion 22 are shown as part of the computer screen image, including a first fashion 22a, a second fashion 22b, and a third fashion 22c. Similarly, several configurations of accessory sets are shown as items 24a, 24b, 24c, and 24d.

All of the above-discussed components shown in FIG. 1 represent three-dimensional aspects of personalized toy 10. However, the method and personalized toy of the present invention also may include other types of components, such as electronic components housed within the toy, and programming for such electronics. The "display" and "representational image" provided by the computer relative to personalized toy 10, may, therefore, also include audio and representational information. For example, toy 10 may be programmed to say a particular phrase or set of words, play a particular tune or song, or move in a particular manner. The image therefore could include playback of a representational audio track, and a moving representational image of toy 10.

Toy 10 is shown in FIG. 1 as part of a computer screen image 26, specifically as part of a representational image 28. Representational image 28 may display the selected configurations. All aspects of a particular personalized toy 10 may be shown, or, as shown in FIG. 1, some components may be shown in a first representational image 28a, and other components may be shown in a second representational image 28b. For example, image 28b displays a customer's selection of configuration 24d of accessory set 24.

Also shown in FIG. 1, as part of image 26, are several icons 30 used to navigate within internet web pages, and a browser tool bar 32 for similar purposes. Representational images 28 may also be icons. A customer viewing the displayed images may record a selected configuration of component by clicking on the representational image.

In FIG. 2, personalized toy 10 is shown placed in a package 34. Preferably, package 34 includes one or more apertures 36. For example, one such aperture 36a is provided so that personalized toy 10 may be seen from the exterior of package 34. A second aperture 36b may be provided so that printed material 38 may be placed within aperture 36b to create the appearance of a personalized package.

Referring to FIG. 3, the components of the packaged, personalized toy shown in FIG. 2 are shown, partially unpackaged. Printed material 38 preferably includes textual information such as a story 40, which also may include a certificate of authenticity, and a description of the selected configuration for personalized toy 10, the customer, and/or the recipient. Printed material 38 further may include identifying material 42, preferably a customer-defined toy name 44 and a customer-defined intended recipient 46.

Printed material 38 may be connected to personalized toy 10 and package 34, as desired. Printed material 38 may either be printed as a separate document, as shown, or printed directly on package 34 or toy 10. In the embodiment shown in FIGS. 2 and 3, printed material 38 is printed on a single side of a sheet of cardstock, and folded so that the printed material is visible from both sides of the fold. Preferably, package 34 is formed to include a front flap 50 with tabs 52 formed on the inside of flap 50.

Printed material 38, folded as shown, is connected to package 34, or, more specifically for the embodiment shown, connected to the inside of flap 50, by inserting edges of printed material 38 under tabs 52. Dashed lines 38a represent printed material 38 held within package 34. Flap 50 is also preferably made from a folded sheet of cardstock, so that printed material does not show in FIG. 2 except through aperture 36b. Tabs 52 are hidden by the front layer of the folded card stock of flap 50. Similar tabs and flaps may be placed elsewhere on or inside package 34, as desired.

Other details of package 34 shown in FIG. 3 include a toy-support card 54, which may be shaped to display personalized toy 10 while toy 10 is secured inside package 34. Retaining straps 56 may be used to hold personalized toy 10 relative to packing card 54, and to hold other components of personalized toy 10, such as accessory set 24d, as shown. Numerous other components or accessories may be enclosed within package 34, as desired, and as appropriate for the type of toy 10 that is being manufactured.

Figure 4:
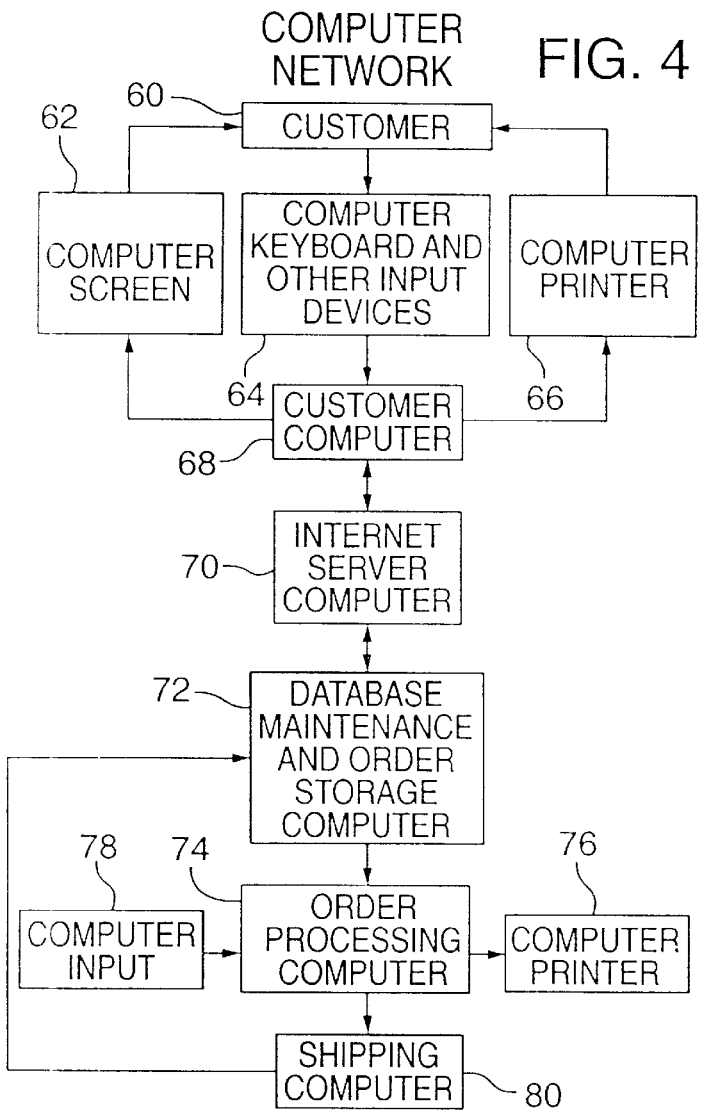
FIG. 4 is a block diagram of a computer network and selected peripheral devices that may be used to practice the invented method.

FIGS. 1–3 provide a brief overview of the specific components for a particular personalized toy, and some of the images that may be displayed on a computer as part of creating a personalized toy 10. The embodiments of the invented method disclosed herein are accomplished best through a distributed computer network, such as the internet or world wide web. Selected components of an example distributed computer network are illustrated in FIG. 4, in block diagram form. The arrows connecting the various blocks in FIG. 4 indicate the typical direction of information flow.

In FIG. 4, a customer 60 receives information from a computer screen 62, and inputs information into the computer network through a computer keyboard or other input devices 64. Customer 60 also may receive information from a computer printer 66 or other output device. Computer screen 62, input device 64, and printer 66 preferably are connected to a customer computer 68.

Customer computer 68 communicates with an internet server computer 70, which may be numerous computers as part of the worldwide web or internet. Internet server computer 70 is serviced in turn by a database maintenance and order storage computer 72, typically located at a data processing facility of the manufacturer. Order computer 72 then transfers a group of orders to an order processing computer 74, which may include a computer printer or other output device used in assembling the various configurations of components specified in a particular order. Order processing computer may add additional instructions to the order, as needed. These additional instructions are predefined to allow for a complete toy to be assembled without requiring customer selection of every detail of the toy. For example, it may be desired to require that every doll include a head, two legs and two arms, interconnected by a torso.

Order processing computer 74 also may include computer input devices, including a bar code reader, keyboard, or touch screen. Finally, yet another computer is shown as a shipping computer 80, through which the shipping and delivery of completed orders are tracked.

The various computers shown in FIG. 4 are shown schematically only. It will be understood by those having skill in the art of computer networks that the complete network may include numerous computers in addition to or as represented by each computer shown in FIG. 4. Furthermore, it is envisioned that numerous customers 60 will access the internet from various locations as part of the selecting, displaying, ordering, and manufacturing steps, discussed below.

With this background, FIG. 5 now will be described, showing a flowchart of some of the steps useful in a method for manufacturing, marketing, packaging, and distributing personalized toy 10. Many of the steps itemized in FIG. 5 are illustrated by screen images in other figures, as identified in FIG. 5. These screen images in these other figures will be discussed in more detail, below.

The flowchart in FIG. 5 has been divided generally into two regions, namely collecting orders and processing orders. Beginning first with collecting orders, an initial step is to access a computer, at 110, and determine whether to follow a predefined script for choosing attributes of the toy, or to select which attributes to change, at 112. Accessing a computer in 110 is performed by customer 60, as is the selection of step 112. Assuming customer 60 decides to select specific attributes to change, the next step is performed as part of computer software, and includes accessing databases and displaying choices for several attributes of components for a personalized toy, at 114. Referring back to FIG. 1, step 114 is illustrated by the display of three different configurations 22a, 22b, and 22c of fashion outfits 22, and four different configurations 24a, 24b, 24c, and 24d of accessories 24.

Continuing with FIG. 5, a customer then performs a step of choosing various attributes from the databases, at 116, after which the computer software changes the display to show chosen values for attributes, at 118. In FIG. 1, these steps are indicated by the display in representational image 26a of fashion outfit 22b, and by the display in representational image 26b of fashion accessory 24d.

For some toys, it may be possible to display all configurations of all the components as part of a single image 26. Thus, steps 114, 116, and 118 all would be accomplished as part of a single image 26. Alternatively, as illustrated in FIG. 1, only a certain number of the components may be displayed in a particular image 26, in which case steps 114, 116, and 118 would be repeated, as necessary, for additional components. After all components have been selected, as desired by a customer, an order initiation step 120 may be selected. If a customer indicates that the order is to be initiated, preferably a summary of personalized toy 10 is displayed, at 122.

A similar set of steps may be used to accomplish the same result, as illustrated in FIG. 5 as part of following a predefined script. In the embodiment disclosed in FIGS. 11–23, described in more detail below, the first step after step 112 is to input identifying information, at 124. This identifying information may be considered part of the components that are assembled to obtain personalized toy 10, even though it generally is only produced in the form of printed material 38 that is packaged with toy 10. Some of the identifying information may, however, be applied to toy 10 as a label, or even printed directly on or as a part of toy 10, as discussed below.

As part of the predefined script, the next attribute is selected by first accessing a database and displaying choices for that attribute, at 126, then choosing a particular attribute from the database, at 128, and, finally, changing the display to show a chosen value for an attribute, at 130. Steps 126, 128, and 130 are repeated in a predefined order until all attributes have been selected, at 132. After the display has been changed to show a chosen value for the final attribute, at 130, a summary of personalized toy 10 is displayed, at 134, similar to step 122.

For many of the above-identified steps, forward or backward progress from one step to the next may be accomplished by selecting particular icons 30 or tools on browser toolbar 32, as will be understood by those having skill in the art of hypertext documents and the internet. For example, in FIG. 1, a forward icon 30a may be used to move forward, and a back icon 30b may be used to move backward relative to the steps shown in FIG. 5.

After the customer approves of the display summary step performed by the computer as part of steps 122 and 134, a different summary image is prepared by the computer, and the customer is asked to confirm the order, at 136. When the appropriate customer input indicates that the order is confirmed, specialized recordings may be prepared, at 138, as discussed in more detail below, and each order is stored as a set of selected attributes, at 140. Preferably, the order is a machine-readable data string stored in computer memory, so that further automated processing may performed, as desired.

The specialized recordings of step 138 may take several different forms, and are believed helpful to marketing personalized toys of the type disclosed herein. One such specialized recording includes a printout of the representational image showing the personalized toy, as created by the customer. Another such specialized recording would include a computer record of the representational image, saved in machine memory, preferably as a web page accessible to the public through the internet by associating the record with a resource locator. The customer then may encourage others to view the representational image of the toy, either by showing the printed image to others or by providing the customer with the resource locator for the personalized web page so that customer may supply others with the resource locator and encourage others to view the image through the internet.

Toys such as personalized toy 10 shown in FIGS. 1–3 often are marketed on a nationwide or worldwide scale, in which case numerous orders will be stored as part of step 140, over time. Preferably, these orders are assembled as a collection of sets of selected attributes, at 142, and forwarded to a manufacturing facility. At some point during the method, an optimized assembly routine may be determined, at 144, after which personalized toys are manufactured according to the optimized assembly routine, at 146.

If desired, identifying material based on each order or set of selected attributes may be printed, at 148, and the identifying material and matching personalized toy may be packaged, at 150. As part of packaging step 150, each package may be labeled with a delivery address based on the identifying material. The labeled, packaged, personalized toys may be grouped, at 154, and shipped to the customer.

Preferably, the step of shipping personalized toys 10 to the customer includes the steps of shipping a group of packages to a central distribution point, at 156, perhaps by air freight or other carrier, as needed. These packages may be processed through Customs while the packages are airborne, at 158, after which each package of the air freighted group is delivered to the destination specified by the label applied as part of step 152, at 160.

It should be understood that the steps shown in FIG. 5 simply are examples of steps in one embodiment of the present invention. Other steps may be added, as desired, and many of the steps may be omitted. Furthermore, the order of the steps may be changed for particular types of personalized toys.

Many of the steps shown in FIG. 5 are illustrated herein by various computer screen images. For example, FIG. 1 illustrates the initial step of accessing a computer, preferably a computer with internet browser software and a graphical user interface. The step of determining whether to select attributes as a group, or follow a predefined script, is shown in FIG. 6, with icon 30c being used to access steps 114–122, and icon 30d being used to access steps 124–134.

Figure 8:
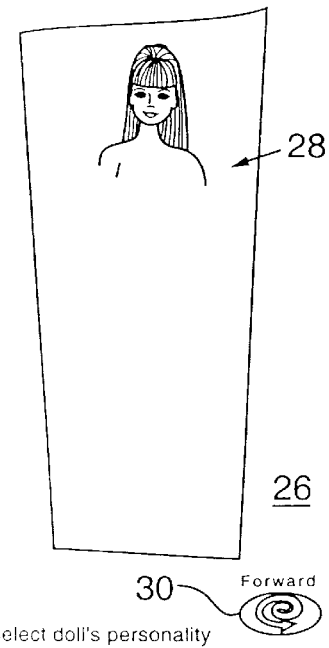
FIG. 8 is a computer screen image illustrating a changed display step from FIG. 5, in which the selections made in FIG. 7 have been implemented in a representational image of the toy.
Figure 7:
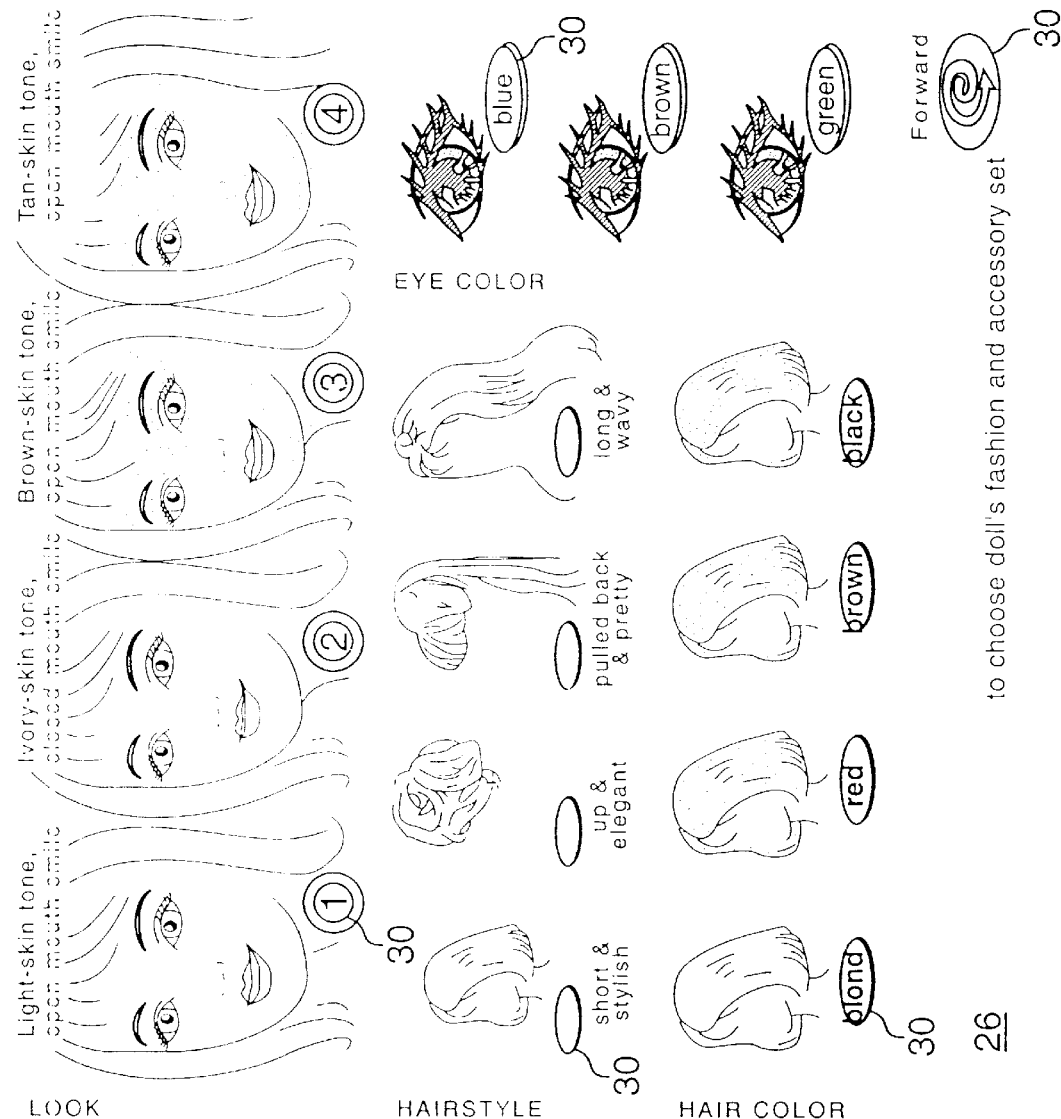
FIG. 7 is a computer screen image illustrating a selection step in the method of FIG. 5, including displaying visual representations of choices for several attributes of components of a doll.

FIG. 1 illustrates one embodiment of steps 114–118, and FIG. 7 represents another embodiment of these steps. The steps illustrated in FIG. 7 preferably are performed before the steps illustrated in FIG. 1. FIG. 8 illustrates a particular embodiment of the step of changing display to show chosen values for attributes, at 118 in FIG. 5. FIGS. 9 and 10 illustrate the selecting of textual aspects of printed material to be included with personalized 10. FIG. 9 specifically illustrates the display before any of the configurations have been selected, and FIG. 10 illustrates the display after all of the configurations have been selected. FIG. 11 then illustrates the display step 122 with all of the selections of various components shown in a single representational image, including printed and non-printed material. FIG. 11 also illustrates the display step 134, if a predefined script is followed.

Figure 13:
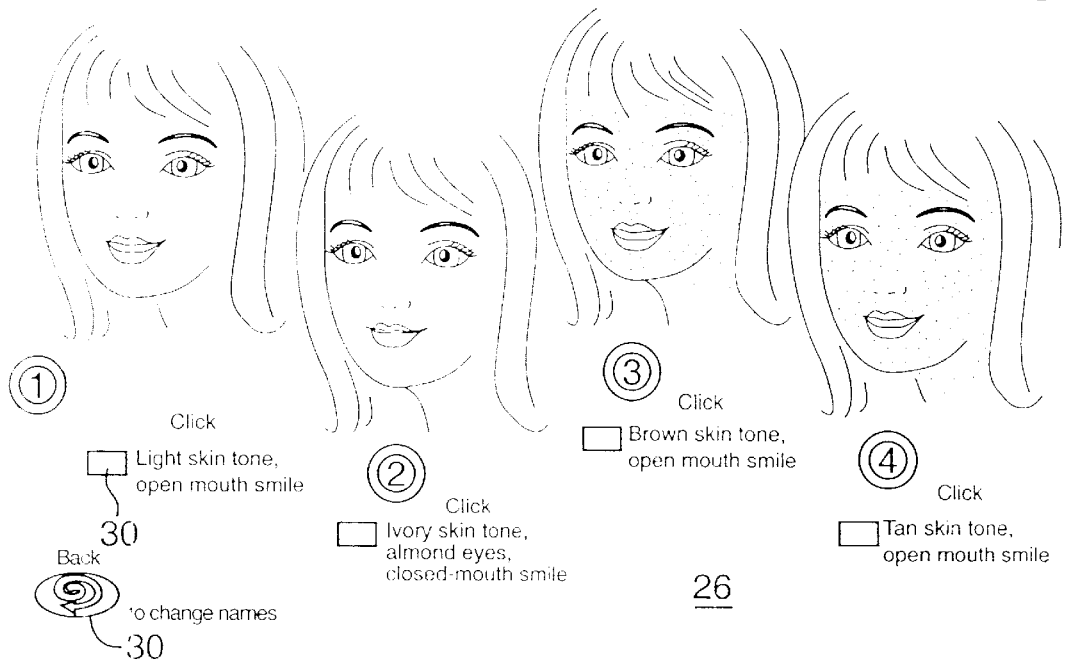
FIG. 13 is a computer screen image illustrating the step of selecting skin and facial characteristics of a doll, representing attributes of doll body parts.
Figure 14:
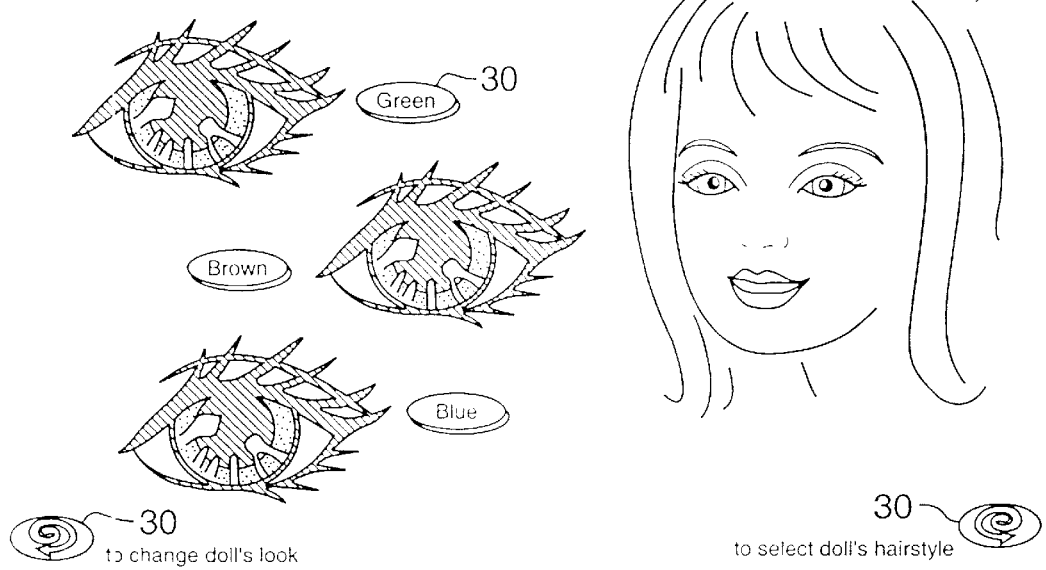
FIG. 14 is a computer screen image illustrating the step of selecting eye color for a doll, representing an attribute of a doll head.

The initial steps of following a predefined script are illustrated in FIGS. 12–23. In FIG. 12, identifying information is input, corresponding to step 124. In FIG. 13, the skin tone and mouth style of a doll are selected, corresponding to steps 126 and 128. In FIG. 14, the display has been changed to display a representational image incorporating the selected configurations of tan skin tone, open-mouth smile from FIG. 13, corresponding to step 130. FIG. 14 also represents the step of repeating steps 126 and 128, pursuant to step 132, specifically for selecting the eye color for a doll.

Figure 15:
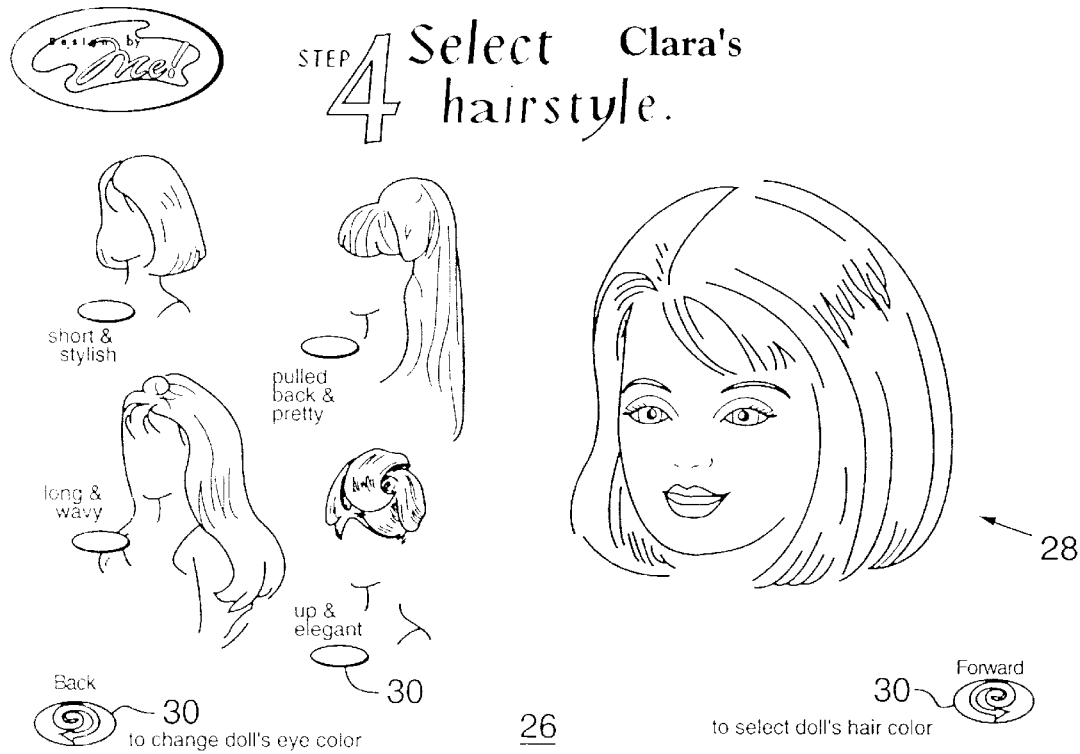
FIG. 15 is a computer screen image illustrating the step of selecting a hairstyle attribute for a doll.
Figure 16:
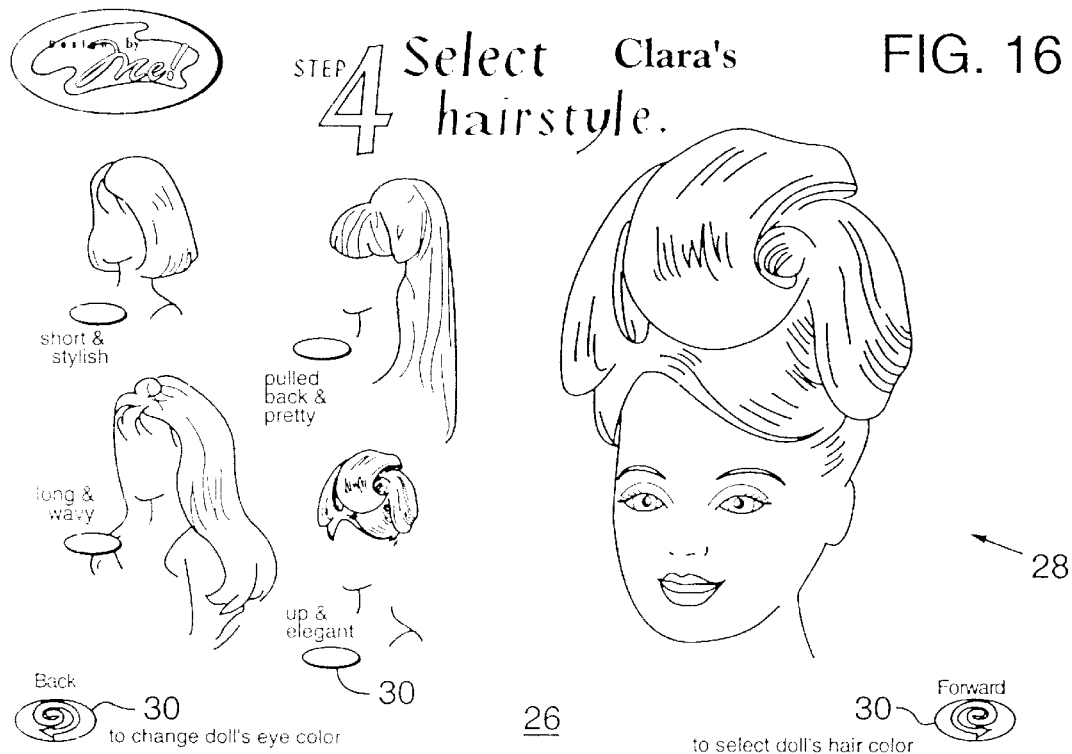
FIG. 16 is a computer screen image illustrating changing the displayed image to show the chosen value for a hairstyle attribute of a personalized doll, when compared to FIG. 15.

FIG. 15 illustrates displaying configurations of a hairstyle, and FIG. 16 illustrates changing the representational image 28 to reflect a selected hairstyle. Similarly, FIG. 17 illustrates both displaying various aspects of hair color, and displaying a representational image of a toy incorporating the selected hair color.

FIG. 18 illustrates a change of the display, primarily in response to text information input by the customer. FIG. 18 illustrates what might best be described as a transitional step, not shown in FIG. 5. The displayed image of FIG. 18 remains on the screen for a predefined period of time, and then automatically transitions into the image of FIG. 19. A customer may force the transition prior to the predefined period of time by clicking on the "Click here to continue" icon of FIG. 18. FIG. 19 is another transitional step, but more closely corresponds to step 130, illustrating a change in the display to show the cumulative effect of the attributes selected as part of FIGS. 12–17. FIG. 20 illustrates a similar transitional step.

Figure 21:
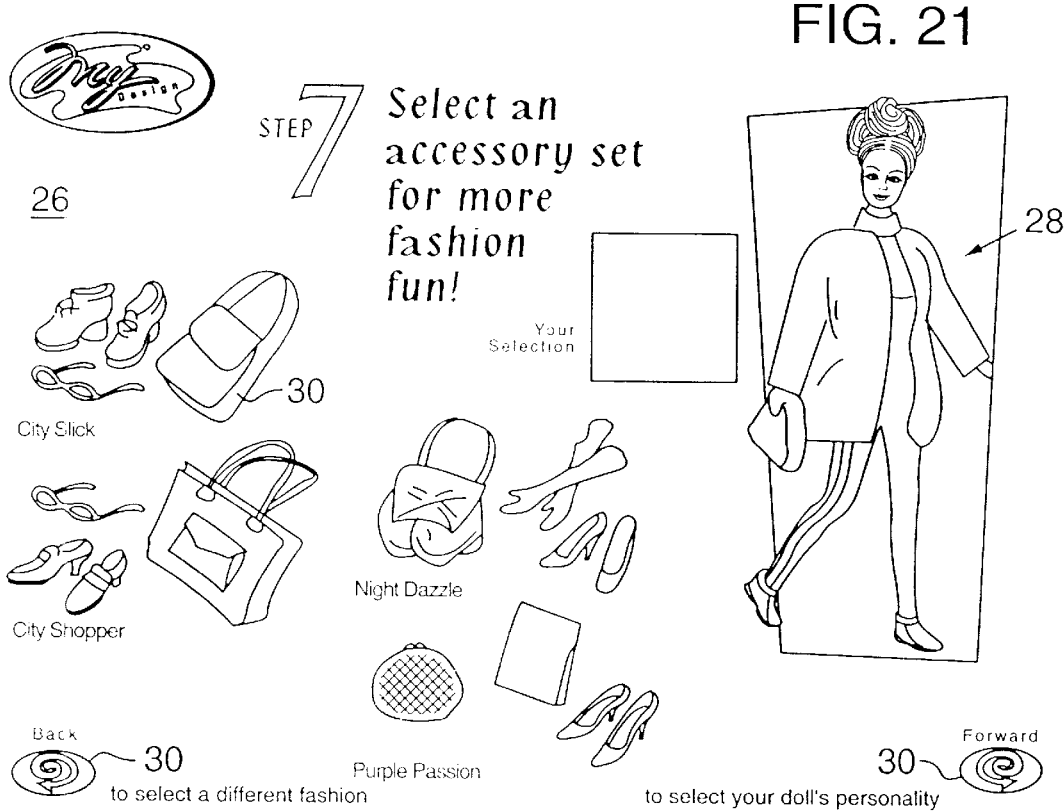
FIG. 21 is a computer screen image illustrating the step of selecting fashion accessories for a doll.
Figure 22:
FIG. 22 is a computer screen image illustrating a changed display in which the fashion accessory attribute selected is displayed separately from the customer-specified doll.

In FIG. 20, steps 126–130 are illustrated for selecting a fashion outfit and, in FIG. 21, step 126 is illustrated with respect to an accessory set. FIG. 21 differs somewhat from the images shown in FIGS. 12–20 in that a separate portion of the display is allocated for being changed through a representational image 28b of the accessory set, which is blank in FIG. 21 because no selection has been made. In FIG. 22, a selection has been made, and representational image 28b reflects this selection.

Figure 23:
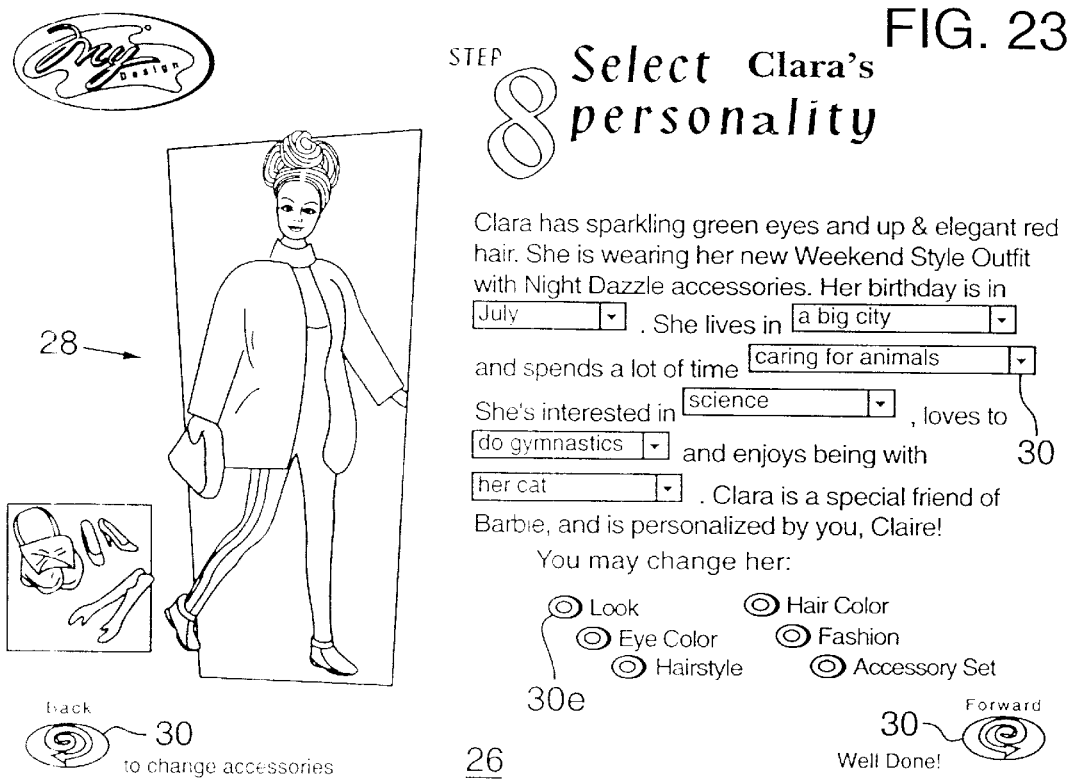
FIG. 23 is a computer screen image illustrating display and selection of text attributes in connection with a narrative description of a customer-specified doll, similar to the computer screen image of FIG. 11, and further including component-specific icons providing hypertext links to the steps illustrated by FIGS. 13–17, 20, and 21.
Figure 24:
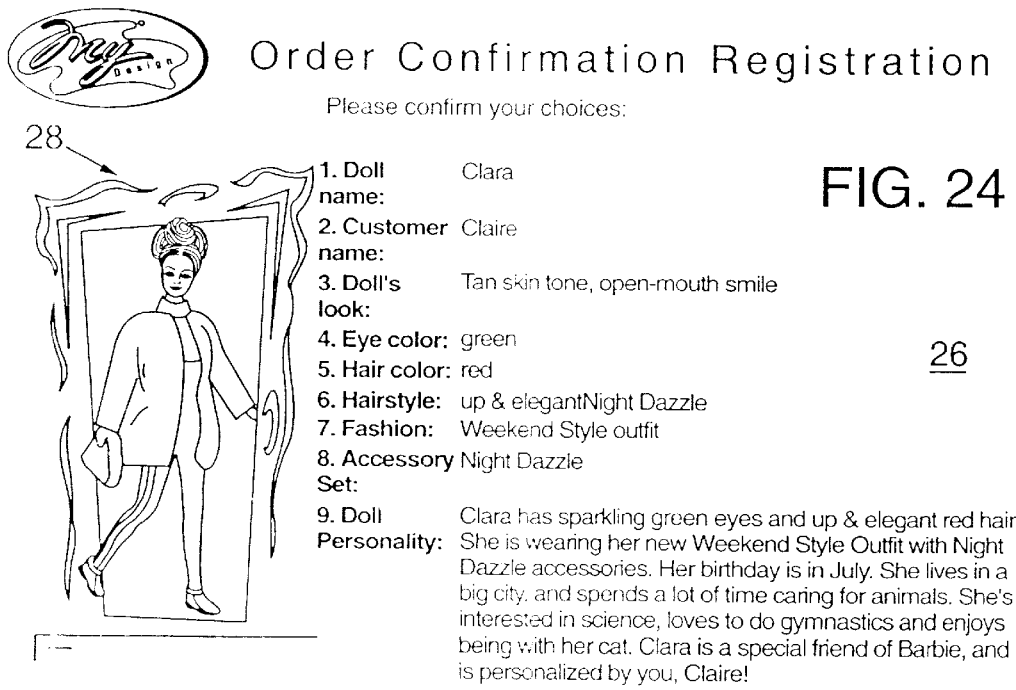
FIG. 24 is a computer screen image illustrating the step of displaying an itemized list of identifiers associated with the customer-selected attributes of the components of the doll, and illustrating the step of confirming the selection of attributes in the form of a "Already Registered" icon and a "New Registration" icon.

FIG. 23 is similar to FIG. 10, but the text input boxes of FIG. 10 have been replaced by icons allowing direct access to displays related to particular components of personalized toy 10. For example, icon 30e allows a customer to return to the display for selecting the look of personalized toy 10, as illustrated in FIG. 13. After the particular selection is made in FIG. 13, the computer software automatically returns to the display of FIG. 23. FIG. 24 contains a slightly different summary from that shown in FIG. 11, and corresponds to the step of confirming the order, at 136 in FIG. 5. For the customer to indicate "yes" with respect to step 136, the icon "Already Registered" 30f or "New Registration" 30g are used to access a conventional internet registration and purchase program, as will be understood by those having skill in the art of internet commerce. After the appropriate purchase information is entered, steps similar to those corresponding to 138–160 of FIG. 5 may be completed by the manufacturer or seller of personalized toy 10.

Figure 25:
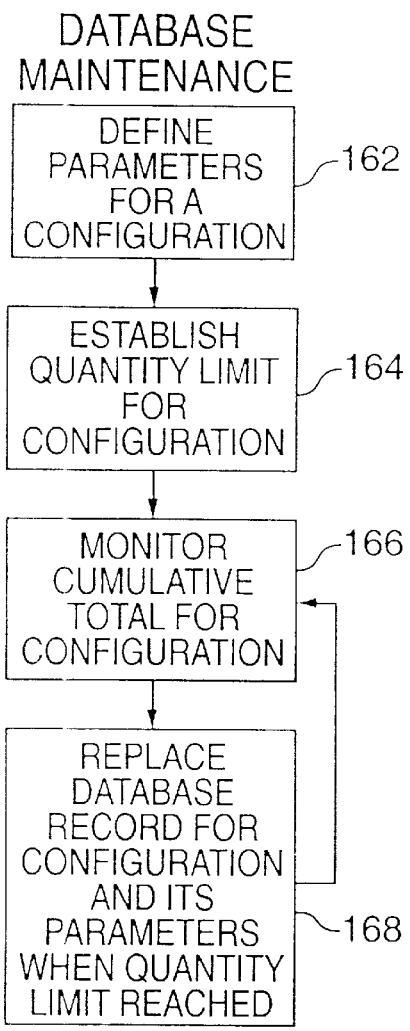
FIG. 25 is a flow chart representing steps of the present invention used to maintain a database of configurations of components for a toy, and limiting the quantity of such configurations.

As discussed above, numerous variations in the content and chronology of the various steps, and variations in the type of personalized toy 10 are possible. For example, FIG. 25 shows several steps useful for a unique database management routine by which limited editions are controlled for specific personalized toys 10. The database first is created by defining parameters for a configuration, at 162, and establishing a quantity limit for at least one configuration, at 164. Steps 162 and/or 164 may be repeated, as desired, for as many configurations of components of a personalized toy as the manufacturer intends to allow customers to select.

Once the database is made available to customer selection, as illustrated in FIGS. 1–23, a cumulative total for each configuration having a quantity limit is maintained, at 166. When the established quantity limit is reached, the entire database record for that configuration is replaced, including the parameters defining that configuration. This prevents further customer selection of the particular configuration. Alternatively, the record may be altered so that it instructs the computer not to allow customer selection of the configuration.

Through steps 166 and 168, limited editions of personalized toy 10 may be controlled. It is believed that this will increase the value to the customer of each personalized toy. Altering the record for a particular configuration, as discussed above, may also include altering the displayed representation to remind a customer that the particular configuration is no longer available.

Figure 26:
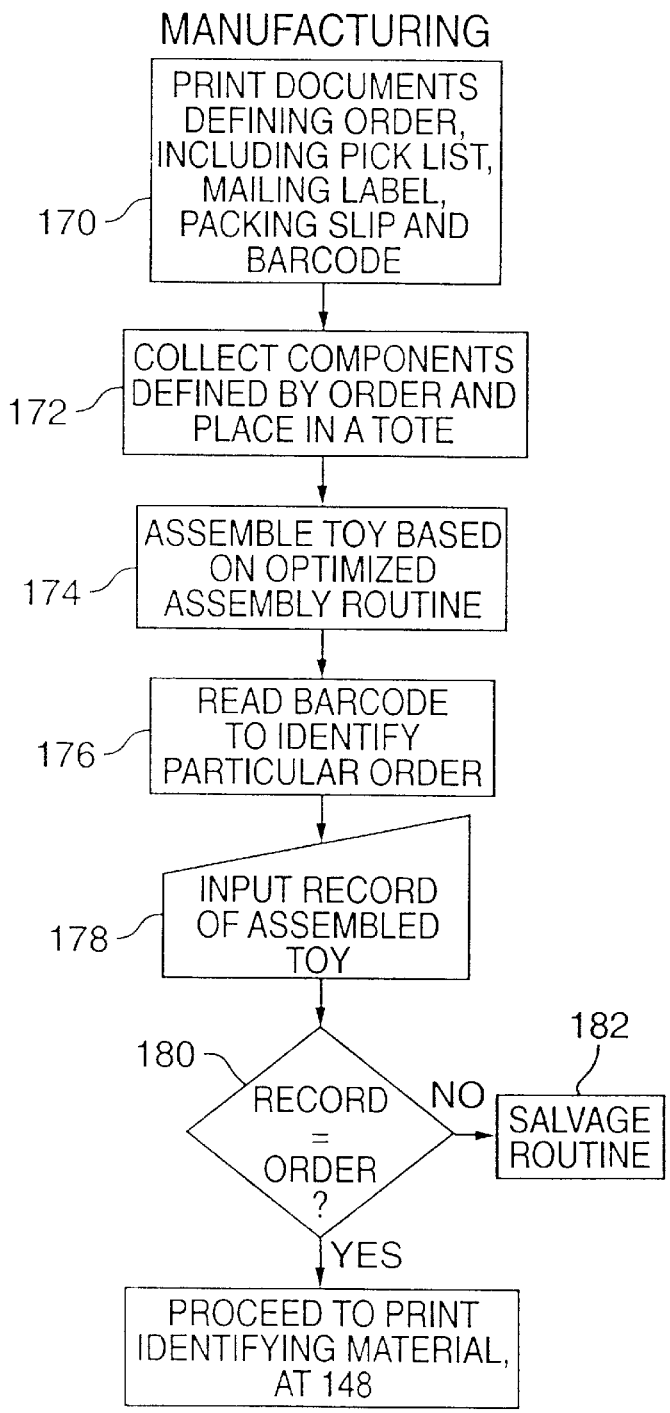
FIG. 26 is a flow chart representing steps of the present invention used to verify that a personalized toy is manufactured to match a customer order prior to delivering the personalized toy to a designated recipient.

FIG. 26 represents further refinements related to manufacturing personalized toy 10. Preferably, manufacturing includes printing documents defining the order, including a pick list, a mailing label, packing slip, and bar code or other machine-readable glyph, at 170. Components then are collected as defined by each order, and the collected components and order placed in a tote or other container for use in assembly line processing, at 172. Personalized toy 10 then is assembled based on an optimized assembly routine, at 174.

Preferably, the manufacturing process includes verifying that the personalized toy ordered by a customer matches the personalized toy assembled and delivered to an intended recipient. This is accomplished best by reading a bar code from printed material defining the order so that a computer may identify the machine-readable data string for the particular order associated with the personalized toy, at 176. A machine-readable record of the assembled personalized toy 10 then is saved in the computer at 178. This may be accomplished by a human inputting data codes identifying the various configurations of components in personalized toy 10, or by using machine vision or other methods of inputting information into a computer. In either case, the record is based on physical observation of the assembled personalized toy, and not based on some pre-recorded data string.

The record created based on the assembled personalized toy 10 then is compared to the order that defines the intended personalized toy, at 180, and the personalized toy then is sent to further processing only if the record matches the order. If the record does not match the order, a salvage routine may be initiated for the assembled toy, at 182.

Figure 27:
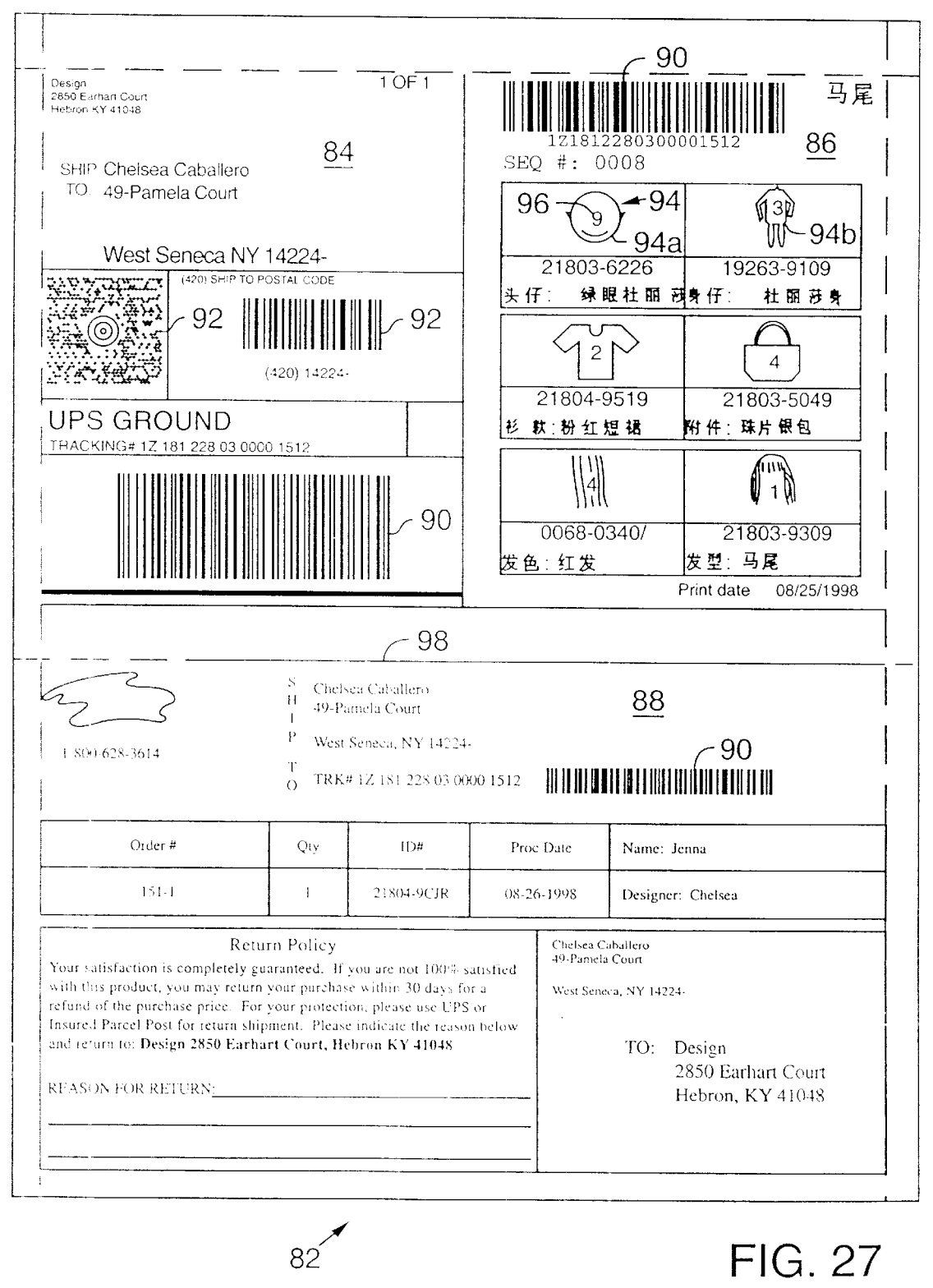

Turning now to FIG. 27, a manufacturing or production document 82 is shown, including a mailing label 84, a production list 86, and a packing list 88. A bar code 90 is printed on each of label 84, list 86, and list 88. Other bar codes or data glyphs may be printed on the document, as desired, as indicated by glyphs 92. The use of a matching bar code 90 on each of the separable portions of documents 82 allows uniform reference to be made to the same personalized toy. The shipper may use mailing label 84, and the manufacturing facility may use production list 86. Furthermore, a customer service facility may use packing list 88 in processing a return or warranty claim with respect to the personalized toy.

Further improvements of production document 82 include the use of various icons 94 as part of production list 86. For example, icon 94*a* instructs a worker that it refers to the head of a doll and icon 94*b* refers to the body of a doll. An identifier 96 may be printed as part of icon 94 to identify the particular configuration of the component that is to be used for the personalized toy. It has been found that the combination of an icon 94 and a written identifier 96 ensures better quality control in the assembly of personalized toys according to the method of the present invention.

In one embodiment of production document 82, the separable portions of document 82 are printed on adhesive paper, so that each portion may be removed and adhered to an appropriate part of the personalized toy or its packaging. For example, mailing label 84 is removed and placed on a shipping container that encloses and protects the package for the toy, such as package 34 shown in FIG. 2.

Furthermore, production document 82 may be perforated along line 98, so that packing list 88 may be separated from production document 82 without exposing its associated adhesive backing. This allows packing list 88 to be included in package 34 in a form that the intended recipient can remove and store for later use. If the intended recipient later needs to return personalized toy 10 to a customer service facility, the customer need only expose the adhesive backing of packing list 88, place the entire packing list onto package 34 as a mailing label, and ship package 34 and personalized toy 10 as instructed.

Production document 82 might also include, as part of the same or a separate sheet, personalized labels that may be removed and attached to the toy. For example, a stand or base may be provided for the doll shown in FIGS. 2 and 3, with a name plate attached to the doll identifying the name assigned to the doll and the intended recipient of the doll.

The foregoing description of the preferred embodiment of the invention has been presented for purposes of illustration and description. It is not intended to be exhaustive or to limit the invention to the precise form disclosed, and many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined only by the claims.

We claim:

1. A method for marketing a toy, comprising the steps of:

providing several different configurations for at least one of a plurality of components that may be assembled as part of a finished toy;

displaying on a computer screen images of the different configurations of the at least one of the components;

allowing a customer viewing the displayed images to record a selected configuration of the at least one of the components, to be assembled as part of a personalized toy;

displaying a representational image of a toy incorporating the selected configuration;

saving in machine memory a record of a representational image of a toy incorporating the selected configuration;

making the record of the representational image accessible to the public by associating the record with a resource locator; and providing the customer with the resource locator so that the customer may provide others with the resource locator and encourage others to view the image of a toy incorporating the selected configuration.

2. The method according to claim 1, further comprising the step of printing a representational image of a toy incorporating the selected configuration.

3. A method for marketing a toy, comprising the steps of:

providing several different configurations for at least one of a plurality of components that may be assembled as part of a finished toy;

displaying on a computer screen images of the different configurations of the at least one of the components;

allowing a customer viewing the displayed images to record a selected configuration of the at least one of the components, to be assembled as part of a personalized toy;

displaying a representational image of a toy incorporating the selected configuration;

establishing a quantity limit for at least one of the configurations of the at least one of the components;

maintaining a cumulative total of customer selection of the at least one of the configurations; and preventing further customer selection of the at least one of the configurations after the cumulative total of the at least one of the configurations exceeds the quantity limit for that configuration.

4. A method for marketing a toy, comprising the steps of:

providing several different configurations for at least one of a plurality of components that may be assembled as part of a finished toy;

displaying on a computer screen images of the different configurations of the at least one of the components;

allowing a customer viewing the displayed images to record a selected configuration of the at least one of the components, to be assembled as part of a personalized toy;

displaying a representational image of a toy incorporating the selected configuration;

assembling a personalized toy according to predefined instructions as modified by the selected configuration;

providing a package;

printing identifying material for the selected configuration;

connecting the identifying material to the package; and placing the personalized toy in the package.

5. The method according to claim 4, wherein the identifying material is printed directly on the package.

6. The method according to claim 4, wherein:

the package has an aperture within which printed material may be viewed from outside the package; and the identifying material is printed on a document separate from the package, and then attached to the package, with the identifying material visible within the aperture.

7. The method according to claim 6, wherein the document is attached to the package by tabs that hold an edge of the document.

8. A method for marketing a toy, comprising the steps of:

proving several different configurations for at least one of a plurality of components that may be assembled as part of a finished toy;

displaying on a computer screen images of the different configurations of the at least one of the components;

allowing a customer viewing the displayed images to record a selected configuration of the at least one of the components, to be assembled as part of a personalized toy;

displaying a representational image of a toy incorporating the selected configuration;

saving the selected configuration as a machine-readable order;

assembling a personalized toy according to predefined instructions as modified by the selected configuration in the machine-readable order;

saving as a machine-readable record an indication of the particular configuration of at least one of the components in the personalized toy based on physical observation of the assembled personalized toy; and verifying that the order matches the record.

9. The method according to claim 8, further comprising the steps of:

providing a package;

printing identifying material for the selected configuration;

connecting the identifying material to the package; and placing the personalized toy in the package.

10. The method according to claim 9, wherein the identifying material is printed directly on the package.

11. The method according to claim 9, wherein:

the package has an aperture within which printed material may be viewed from outside the package; and the identifying material is printed on a document separate from the package, and then attached to the package, with the identifying material visible within the aperture.

12. The method according to claim 11, wherein the document is attached to the package by tabs that hold an edge of the document.

13. A method for manufacturing a toy, comprising the steps of:

providing several different configurations for at least one of a plurality of components that may be assembled as part of a finished toy;

establishing a quantity limit for at least one of the configurations of the at least one of the components;

recording in a computer database a customer selection of at least one of the configurations of the at least one of the components, to be assembled as part of a personalized toy;

maintaining a cumulative total of customer selection of the at least one of the configurations; and preventing further customer selection of the at least one of the configurations after the cumulative total of the at least one of the configurations exceeds the quantity limit for that configuration.

14. The method according to claim 13, further comprising the steps of:

printing identifying material for the selected configuration;

providing a package having an aperture within which printed material may be viewed from outside the package;

placing the personalized toy in the package; and placing the identifying material within the aperture.

15. A method for manufacturing and packaging a toy, comprising the steps of:

providing several different configurations for at least one of a plurality of components that may be assembled as part of a finished toy;

recording in a computer database a customer selection of at least one of the configurations of the at least one of the components, to be assembled as part of a personalized toy;

providing a package;

printing identifying material for the at least one of the configurations;

connecting the identifying material to the package;

assembling a personalized toy with the at least one of the configurations; and placing the personalized toy in the package.

16. The method according to claim 15, wherein the identifying material is printed directly on the package.

17. The method according to claim 15, wherein:

the package has an aperture within which printed material may be viewed from outside the package; and the identifying material is printed on a document separate from the package, and then attached to the package, with the identifying material visible within the aperture.

18. The method according to claim 17, wherein the document is attached to the package by tabs that hold an edge of the document.

19. A method for manufacturing and packaging a personalized toy, comprising the steps of:

providing several different configurations of components that may be assembled as part of a finished toy;

saving as a machine-readable order a customer selection of a particular configuration of at least one of the components and a recipient of a personalized toy defined at least in part by the order;

assembling a personalized toy according to predefined instructions as modified by a customer selection in the machine-readable order;

saving as a machine-readable record an indication of the particular configuration of at least one of the components in the personalized toy based on physical observation of the assembled personalized toy; and verifying that the order matches the record.

20. The method according to claim 19, further comprising the steps of:

printing a manufacturing document including:

a production list identifying a customer selection of a particular configuration of at least one of the components;

a mailing label identifying a recipient of a personalized toy defined at least in part by the order; and a packing list describing the personalized toy;

using the production list during the assembling step;

packaging the personalized toy with the packing list inside a package; and attaching the mailing label to the package.

* * * * *